(12) United States Patent
Kim et al.

(10) Patent No.: US 8,670,022 B2
(45) Date of Patent: Mar. 11, 2014

(54) MOBILE TERMINAL AND METHOD FOR CONTROLLING OPERATION OF THE MOBILE TERMINAL

(75) Inventors: Jonghwan Kim, Seoul (KR); Jeongryoul Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 368 days.

(21) Appl. No.: 12/916,940

(22) Filed: Nov. 1, 2010

(65) Prior Publication Data

US 2011/0102548 A1      May 5, 2011

(30) Foreign Application Priority Data

Nov. 2, 2009      (KR) ........................ 10-2009-0105118

(51) Int. Cl.
*H04N 13/02*      (2006.01)

(52) U.S. Cl.
USPC .................. 348/46; 348/47; 348/50; 348/51; 348/239; 348/333.05; 348/333.11; 348/333.12

(58) Field of Classification Search
USPC ............................................. 348/50; 352/62
See application file for complete search history.

(56) References Cited

U.S. PATENT DOCUMENTS

| | | | | |
|---|---|---|---|---|
| 6,009,188 A | * | 12/1999 | Cohen et al. | 382/154 |
| 6,157,424 A | * | 12/2000 | Eichenlaub | 349/74 |
| 2002/0010655 A1 | * | 1/2002 | Kjallstrom | 705/27 |
| 2004/0046885 A1 | * | 3/2004 | Regan et al. | 348/333.11 |
| 2004/0164956 A1 | * | 8/2004 | Yamaguchi et al. | 345/156 |

* cited by examiner

*Primary Examiner* — Sath V Perungavoor
*Assistant Examiner* — Dakshesh Parikh
(74) *Attorney, Agent, or Firm* — Lee, Hong, Degerman, Kang & Waimey

(57) ABSTRACT

A mobile terminal and a method for controlling the operation of the same are provided. In the method, a screen including a preview image of a camera is displayed on a display module. Then, a preview window is set in a region of the screen and a predictive image of a three-dimensional (3D) stereoscopic image, which can be generated using images of a subject corresponding to the preview image, is displayed on the preview window. Thus, when images are captured to obtain a 3D stereoscopic image, the user can easily operate the camera using such a 3D stereoscopic image preview function.

19 Claims, 14 Drawing Sheets

FIG. 10
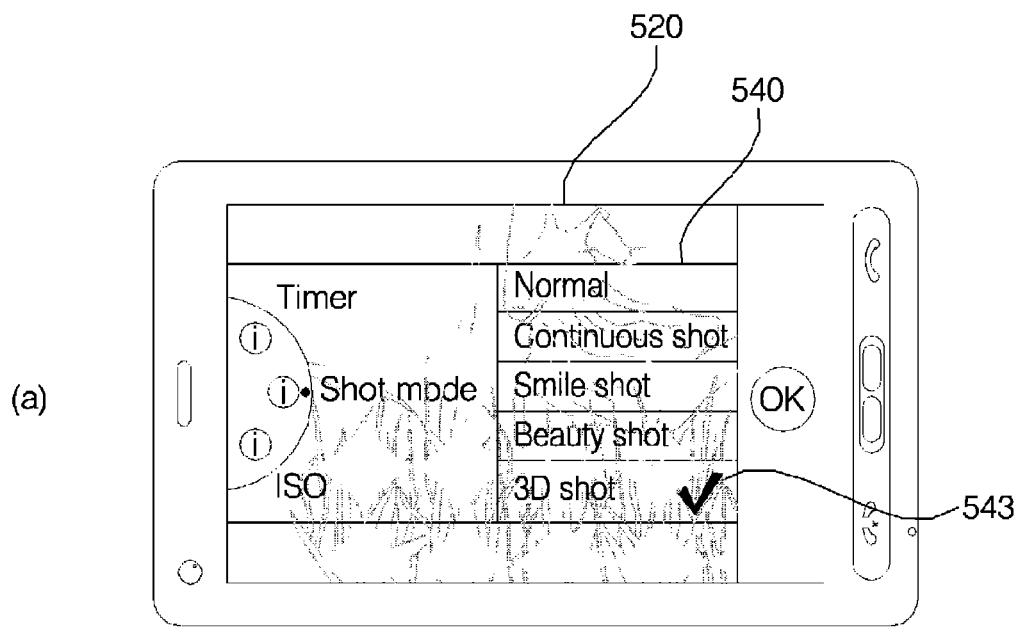
(a)
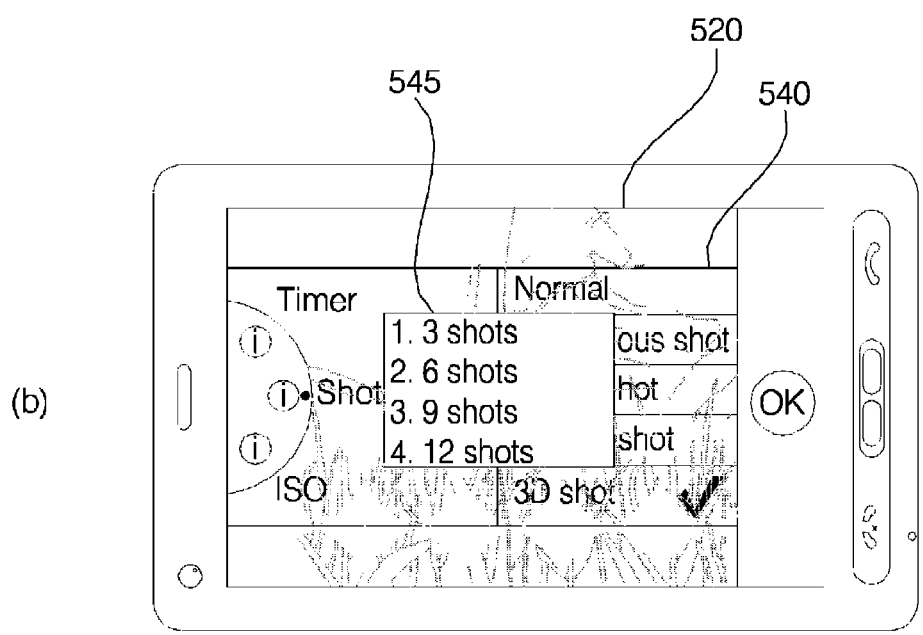
(b)

(a)          (b)          (c)

MOBILE TERMINAL AND METHOD FOR CONTROLLING OPERATION OF THE MOBILE TERMINAL

CROSS-REFERENCE TO RELATED APPLICATION

This application claims the benefit of earlier filing date and right of priority to Korean Patent Application No. 10-2009-0105118, filed on Nov. 2, 2009 in the Korean Intellectual Property Office, the contents of which is incorporated herein by reference in its entirety.

BACKGROUND OF THE INVENTION

1. Field of the Invention

The present invention relates to a mobile terminal and a method for controlling the operation of the mobile terminal, and more particularly to a mobile terminal, which provides a function to preview a 3D stereoscopic image, and a method for controlling the operation of the mobile terminal.

2. Description of the Related Art

A mobile terminal is a portable device having a function to perform voice and video communication, a function to receive and output information, or a function to store data. As the functionality of the mobile terminal has been diversified, a mobile terminal having various complicated functions such as a function to capture still or moving images (i.e., photographs or videos), a function to reproduce music or video files, a game function, a function to receive broadcasts, and a wireless Internet function has been implemented as an all-in-one multimedia player.

Various novel attempts have been made in terms of hardware or software to achieve more complicated functions of the mobile terminal implemented as a multimedia player. One example is provision of a user interface environment allowing the user to easily and conveniently find and select a desired function. As the mobile terminal is now considered a personal belonging expressing the user's personality, there has been demand for various interface designs such as a double-sided Liquid Crystal Display (LCD), which can be viewed from both sides, a touch screen, or a high-resolution camera.

Recently, a technology for generating a three-dimensional (3D) stereoscopic image by combining a number of images captured using a camera through an image processing procedure has also been introduced. If this technology is applied to a mobile terminal, a 3D stereoscopic image can be generated using a camera provided on the mobile terminal.

Thus, when a mobile terminal provides a 3D capture mode for generating a 3D stereoscopic image, there is a need to provide the mobile terminal with a function to preview a 3D stereoscopic image that may be generated using a currently captured image to allow the user to intuitively determine a portion of the subject, which needs to be captured to generate a 3D stereoscopic image, a capture direction, and the like.

SUMMARY OF THE INVENTION

Therefore, the present invention has been made in view of the above circumstances, and it is an object of the present invention to provide a mobile terminal, which can provide a 3D stereoscopic image function when performing image capture to generate a 3D stereoscopic image, and a method for controlling the operation of the same.

In accordance with an aspect of the present invention, the above and other objects can be accomplished by the provision of a method for controlling an operation of a mobile terminal, the method including displaying a screen including a preview image of a camera on a display, setting a preview window in a region of the screen, and displaying, on the preview window, a predictive image of a three-dimensional (3D) stereoscopic image that can be generated using images of a subject corresponding to the preview image.

In accordance with another aspect of the present invention, there is provided a mobile terminal including a camera, a display for displaying a screen including a preview image of a camera, and a controller for setting a preview window in a region of the screen and displaying, on the preview window, a predictive image of a three-dimensional (3D) stereoscopic image that can be generated using images of a subject corresponding to the preview image.

BRIEF DESCRIPTION OF THE DRAWINGS

The above and other features and advantages of the present invention will become more apparent by describing in detail preferred embodiments thereof with reference to the attached drawings in which:

FIGS. 10 and 11 illustrate exemplary camera menu screens;

DETAILED DESCRIPTION OF THE PREFERRED EMBODIMENTS

The present invention will hereinafter be described in detail with reference to the accompanying drawings in which exemplary embodiments of the invention are shown. Further, the term 'mobile terminal' as used herein may indicate a mobile phone, a smart phone, a laptop computer, a digital broadcast receiver, a personal digital assistant (PDA), a portable multimedia player (PMP), a navigation device and the like. In this disclosure, the terms 'module' and 'unit' can be used interchangeably.

Figure 1:
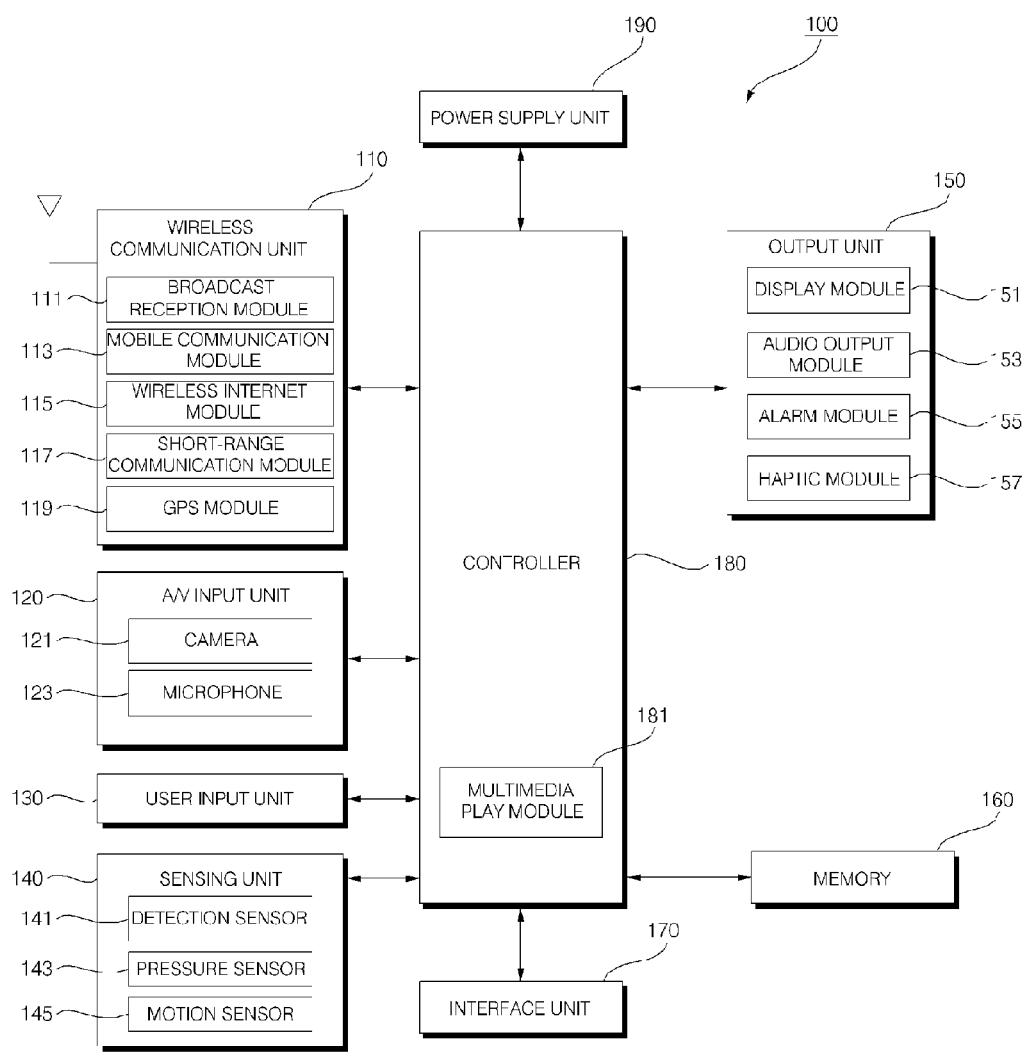
FIG. 1 is a block diagram illustrating a mobile terminal according to an embodiment of the present invention.

First, FIG. 1 is a block diagram illustrating a mobile terminal 100 according to an embodiment of the present invention. Referring to FIG. 1, the mobile terminal 100 includes a wireless communication unit 110, an audio/video (NV) input unit 120, a user input unit 130, a sensing unit 140, an output unit 150, a memory 160, an interface unit 170, a controller 180, and a power supply unit 190. In addition, two or more of the elements may be combined into one element, or one element may be divided into two or more elements, if appropriate.

Further, in the embodiment in FIG. 1, the wireless communication unit 110 includes a broadcast reception module 111, a mobile communication module 113, a wireless Internet module 115, a short-range communication module 117, and a global positioning system (GPS) module 119. The broadcast reception module 111 receives broadcast signals and/or broadcast-related information from an external broadcast management server through a broadcast channel. Further, the broadcast channel may be a satellite channel or a terrestrial channel. Also, the broadcast management server may be a server which generates broadcast signals and/or broadcast-related information and transmits the generated broadcast signals and/or the generated broadcast-related information, or may be a server which receives and then transmits previously-generated broadcast signals and/or previously-generated broadcast-related information.

In addition, the broadcast-related information may include broadcast channel information, broadcast program information and/or broadcast service provider information. The broadcast signals may include a TV broadcast signal, a radio broadcast signal, a data broadcast signal, the combination of a data broadcast signal and a TV broadcast signal or the combination of a data broadcast signal and a radio broadcast signal. Further, the broadcast-related information may be provided to the mobile terminal 100 through a mobile communication network. In this instance, the broadcast-related information may be received by the mobile communication module 113, rather than by the broadcast reception module 111. The broadcast-related information may also come in various forms.

In addition, the broadcast reception module 111 can receive broadcast signals using various broadcasting systems such as the digital multimedia broadcasting-terrestrial (DMB-T) system, the digital multimedia broadcasting-satellite (DMB-S) system, the media forward link only (MediaFLO) system, the DVB-H system, and the integrated services digital broadcast-terrestrial (ISDB-T) system. In addition, the broadcast reception module 111 may be suitable not only for the above-mentioned digital broadcasting systems but also for nearly all types of broadcasting systems other than those set forth herein. The broadcast signal and/or the broadcast-related information received by the broadcast reception module 111 can also be stored in the memory 160.

In addition, the mobile communication module 113 can transmit wireless signals to or receives wireless signals from at least one of a base station, an external terminal, and a server through a mobile communication network. The wireless signals may include various types of data according to whether the mobile terminal 100 transmits/receives voice call signals, video call signals, or text/multimedia messages. Further, the wireless Internet module 115 corresponds to a module for wirelessly accessing the Internet. The wireless Internet module 115 may also be embedded in the mobile terminal 100 or may be installed in an external device. The wireless Internet module 115 may also use various wireless Internet technologies such as the wireless local area network (WLAN), Wireless Broadband (WiBro), World Interoperability for Microwave Access (Wimax), and High Speed Downlink Packet Access (HSDPA).

In addition, the short-range communication module 117 corresponds to a module for short-range communication and may use various short-range communication techniques such as Bluetooth, radio frequency identification (RFID), infrared data association (IrDA), ultra wideband (UWB), and ZigBee. Further, the GPS module 119 can receive position information from a plurality of GPS satellites. Also, the A/V input unit 120 can be used to receive audio signals or video signals, and in FIG. 1 includes a camera 121 and a microphone 123.

In more detail, the camera 121 processes various image frames such as still images or moving images captured by an image sensor during a video call mode or an image capturing mode. The image frames processed by the camera 121 can also be displayed by a display module 151 included in the output unit 150. Further, the image frames processed by the camera 121 may be stored in the memory 160 or may be transmitted to an external device through the wireless communication unit 110. The mobile terminal 100 may also include two or more cameras 121.

In addition, the microphone 123 can receive external (e.g., voice) sound signals during a call mode, a recording mode, or a voice recognition mode with the use of a microphone and can convert the sound signals into electrical sound data. In the call mode, the mobile communication module 113 converts the electrical sound data into data that can be readily transmitted to a mobile communication base station and then outputs the data obtained by the conversion. The microphone 123 may also use various noise removal algorithms to remove noise that may be generated during the reception of external sound signals.

In addition, the user input unit 130 can generate key input data based on user input for controlling the operation of the mobile terminal 100. The user input unit 130 may be implemented as a keypad, a dome switch, a touch pad (static pressure/static voltage), a jog wheel, a jog switch, etc. In particular, if the user input unit 130 is implemented as a touch pad and forms a mutual layer structure with the display module 151, the user input unit 130 and the display module 151 may be collectively referred to as a touch screen.

Further, the sensing unit 140 determines a current state of the mobile terminal 100 such as whether the mobile terminal 100 is opened or closed, the position of the mobile terminal 100 and whether the mobile terminal 100 is placed in contact with a user, and generates a sensing signal for controlling the operation of the mobile terminal 100. For example, when the mobile terminal 100 is a slider-type mobile phone, the sensing unit 140 can determine whether the mobile terminal 100 is opened or closed. In addition, the sensing unit 140 can determine whether the mobile terminal 100 is powered by the power supply unit 190 and whether the interface unit 170 is connected to an external device.

Further, in the embodiment in FIG. 1, the sensing unit 140 includes a proximity sensor 141, a pressure sensor 143 and a motion sensor 145. The proximity sensor 141 can detect an approaching object or whether there is an object nearby the mobile terminal 100 without mechanical contact. More specifically, the proximity sensor 141 can detect an approaching object based on a change in an alternating current (AC) magnetic field or a static magnetic field, or the rate of change of capacitance. The sensing unit 140 may also include two or more proximity sensors 141.

In addition, the pressure sensor 143 can determine whether pressure is being applied to the mobile terminal 100 and/or measure the level of pressure, if any, applied to the mobile terminal 100. The pressure sensor 143 may also be installed in a certain part of the mobile terminal 100 where the detection of pressure is needed. For example, the pressure sensor 143 may be installed in the display module 151. In this instance, it is possible to differentiate a typical touch input from a pressure touch input, which is generated using a higher pressure level than that used to generate a typical touch input, based on data provided by the pressure sensor 143. In addition, when a pressure touch input is received through the display module 151, it is possible to determine the level of pressure applied to the display module 151 upon the detection of a pressure touch input based on data provided by the pressure sensor 143.

Further, the motion sensor 145 can determine the location and motion of the mobile terminal 100 using an acceleration sensor or a gyro sensor. In more detail, acceleration sensors are a type of device for converting a vibration in acceleration into an electric signal. With recent developments in microelectromechanical system (MEMS) technology, acceleration sensors have been widely used in various products for various purposes ranging from detecting large motions such as car collisions as performed in airbag systems for automobiles to detecting minute motions such as the motion of the hand as performed in gaming input devices. In general, one or more acceleration sensors representing two or three axial directions are incorporated into a single package. There are some instances when the detection of only one axial direction, for example, a Z-axis direction, is necessary. Thus, when an X- or Y-axis acceleration sensor, instead of a Z-axis acceleration sensor, is required, the X- or Y-axis acceleration sensor may be mounted on an additional substrate, and the additional substrate may be mounted on a main substrate. Further, gyro sensors are sensors for measuring angular velocity, and can determine the relative direction of the rotation of the mobile terminal 100 to a reference direction.

In addition, the output unit 150 can output audio signals, video signals and alarm signals. In the embodiment in FIG. 1, the output unit 150 includes the display module 151, an audio output module 153, an alarm module 155 and a haptic module 157. The display module 151 can display various information processed by the mobile terminal 100. For example, if the mobile terminal 100 is in a call mode, the display module 151 can display a user interface (UI) or a graphic user interface (GUI) for making or receiving a call. If the mobile terminal 100 is in a video call mode or an image capturing mode, the display module 151 can display a UI or a GUI for capturing or receiving images.

Further, if the display module 151 and the user input unit 130 form a mutual layer structure and are thus implemented as a touch screen, the display module 151 can be used as both an output device and an input device. If the display module 151 is implemented as a touch screen, the display module 151 can also include a touch screen panel and a touch screen panel controller. In more detail, the touch screen panel is a transparent panel attached onto the exterior of the mobile terminal 100 and may be connected to an internal bus of the mobile terminal 100.

The touch screen panel keeps monitoring whether the touch screen panel is being touched by the user, and once a touch input to the touch screen panel is received, the touch screen panel transmits a number of signals corresponding to the touch input to the touch screen panel controller. The touch screen panel controller then processes the signals transmitted by the touch screen panel, and transmits the processed signals to the controller 180. Then, the controller 180 determines whether a touch input has been generated and which part of the touch screen panel has been touched based on the processed signals transmitted by the touch screen panel controller.

Further, the display module 151 may include electronic paper (e-paper), which is a type of reflective display technology and can provide as high resolution as ordinary ink on paper, wide viewing angles, and excellent visual properties. E-paper can be implemented on various types of substrates such as a plastic, metallic or paper substrate and can display and maintain an image thereon even after power is cut off. In addition, e-paper can reduce the power consumption of the mobile terminal 100 because it does not require a backlight assembly. The display module 151 may be implemented as e-paper by using electrostatic-charged hemispherical twist balls, using electrophoretic deposition, or using microcapsules, for example.

In addition, the display module 151 may include at least one of a liquid crystal display (LCD), a thin film transistor (TFT)-LCD, an organic light-emitting diode (OLED), a flexible display, and a three-dimensional (3D) display. The mobile terminal 100 may also include two or more display modules 151. For example, the mobile terminal 100 may include an external display module and an internal display module.

Further, the audio output module 153 can output audio data received by the wireless communication unit 110 during a call reception mode, a call mode, a recording mode, a voice recognition mode, or a broadcast reception mode and/or output audio data present in the memory 160. In addition, the audio output module 153 can output various sound signals associated with the functions of the mobile terminal 100 such as receiving a call or a message. The audio output module 153 may also include a speaker and a buzzer.

Also, the alarm module 155 can output an alarm signal indicating the occurrence of an event in the mobile terminal 100. Examples of the event include receiving a call signal, receiving a message, and receiving a key signal. Examples of the alarm signal output by the alarm module 155 also include an audio signal, a video signal and a vibration signal. More specifically, the alarm module 155 can output an alarm signal upon receiving a call signal or a message. In addition, the alarm module 155 can receive a key signal and output an alarm signal as feedback to the key signal. Therefore, the user can easily recognize the occurrence of an event based on an alarm signal output by the alarm module 155. Further, an alarm signal for notifying the user of the occurrence of an event may be output not only by the alarm module 155, but also by the display module 151 or the audio output module 153.

In addition, the haptic module 157 can provide various haptic effects (such as vibration) that can be perceived by the user. If the haptic module 157 generates vibration as a haptic effect, the intensity and the pattern of vibration generated by the haptic module 157 may be altered in various manners. The haptic module 157 can also synthesize different vibration effects and output the result of the synthesization. Alternatively, the haptic module 157 can sequentially output different vibration effects. Further, the haptic module 157 may provide various haptic effects other than vibration such as a haptic effect obtained using a pin array that moves perpendicularly to a contact skin surface, a haptic effect obtained by injecting or sucking in air through an injection hole or a suction hole, a haptic effect obtained by giving a stimulus to the surface of the skin, a haptic effect obtained through contact with an electrode, a haptic effect obtained using an electrostatic force, and a haptic effect obtained by realizing the sense of heat or cold using a device capable of absorbing heat or generating heat. The haptic module 157 may also be configured to enable the user to recognize a haptic effect using the kinesthetic sense of the fingers or the arms. Also, the mobile terminal 100 may include two or more haptic modules 157.

In addition, the memory 160 can store various programs used for the operation of the controller 180, and temporarily store various data such as a list of contacts, messages, still images, or moving images. The memory 160 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal 100 can also operate a web storage on the Internet, which performs the functions of the memory 160.

Further, the interface unit 170 interfaces with an external device that can be connected to the mobile terminal 100. In more detail, the interface unit 170 may be a wired/wireless headset, an external battery charger, a wired/wireless data port, a card socket for, for example, a memory card, a subscriber identification module (SIM) card or a user identity module (UIM) card, an audio input/output (I/O) terminal, a video I/O terminal, or an earphone. The interface unit 170 can also receive data from an external device or be powered by an external device, and transmit data provided by an external device to other components in the mobile terminal 100 or transmit data provided by other components in the mobile terminal 100 to an external device. In addition, when the mobile terminal 100 is connected to an external cradle, the interface unit 170 provides a path for supplying power from the external cradle to the mobile terminal 100 or for transmitting various signals from the external cradle to the mobile terminal 100.

Further, the controller 180 controls the general operations of the mobile terminal 100. For example, the controller 180 can perform various control operations regarding making/receiving a voice call, transmitting/receiving data, or making/receiving a video call. In FIG. 1, the controller 180 also includes a multimedia player module 181, which plays multimedia data. The multimedia player module 181 may be implemented as a hardware device and may be installed in the controller 180. Alternatively, the multimedia player module 181 may be implemented as a software program.

In addition, the power supply unit 190 may be supplied with power by an external power source or an internal power source and supply power to the other components in the mobile terminal 100. The mobile terminal 100 may include a wired/wireless communication system or a satellite communication system and thus can operate in a communication system capable of transmitting data in units of frames or packets.

Next, the exterior of the mobile terminal 100 will be described in detail with reference to FIGS. 2 and 3. For convenience, the mobile terminal 100 is assumed to be a slider-type mobile terminal equipped with a touch screen. However, the present invention is not restricted to a slider-type mobile terminal. Rather, the present invention can be applied to various mobile phones other than a slider-type mobile terminal.

Figure 2:
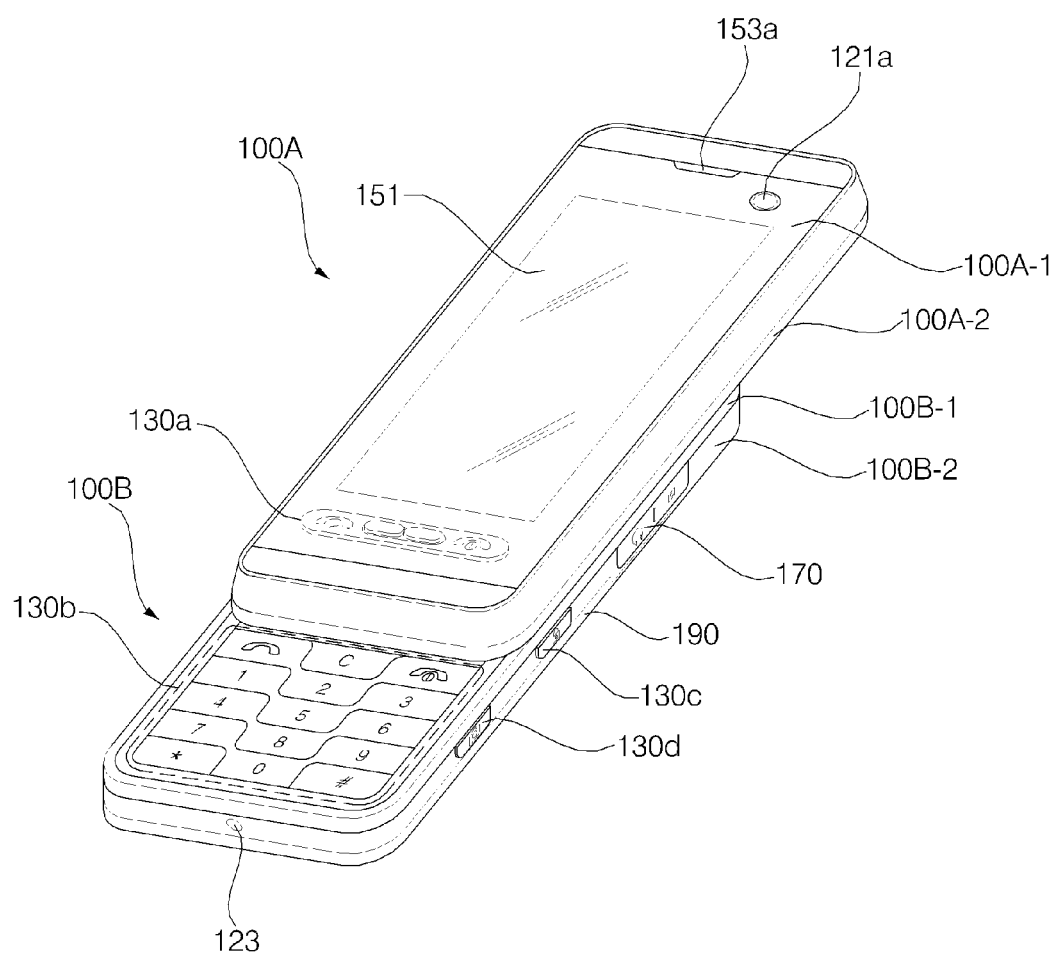
FIG. 2 is a front perspective view illustrating the mobile terminal shown in FIG. 1.

As shown, FIG. 2 is a front perspective view illustrating the mobile terminal 100 shown in FIG. 1. Referring to FIG. 2, the mobile terminal 100 includes a first body 100A and a second body 100B, which can slide up or down against the first body 100A. Also, when the first body 100A and the second body 100B completely overlap each other, the mobile terminal 100 is referred to as being closed. On the other hand, when the first body 100A is slid up against the second body 100B and thus the front of the second body 100B is partially exposed, as shown in FIG. 2, the mobile terminal 100 is referred to as being opened.

When the mobile terminal 100 is closed, the mobile terminal generally operates in a standby mode and can be released from the standby mode in response to user manipulation. On the other hand, when the mobile terminal 100 is opened, the mobile terminal 100 generally operates in a call mode and can be switched to the standby mode either manually in response to user manipulation or automatically after the lapse of a predefined amount of time.

Referring to FIG. 2, the exterior of the first body 100A is defined by a first front case 100A-1 and a first rear case 100A-2. Various electronic devices may be installed in the space formed by the first front case 100A-1 and the first rear case 100A-2. At least one intermediate case may be additionally provided between the first front case 100A-1 and the first rear case 100A-2. Further, the first front case 100A-1 and the first rear case 100A-2 may be formed of a synthetic resin through injection molding. Alternatively, the first front case 100A-1 and the first rear case 100A-2 may be formed of a metal such as stainless steel (STS) or titanium (Ti).

Also, as shown, the display module 151, a first audio output module 153a, a first camera 121a and a first user input module 130a are disposed in the front case 100A-1. Examples of the display module 151 include an LCD and an OLED which can visualize information. Since a touch pad is configured to overlap the display module 151 and thus to form a mutual layer structure, the display module 151 serves as a touch screen. Thus, it is possible for the user to input various information to the mobile terminal 100 simply by touching the display module 151.

The exterior of the second body 100B may also be defined by a second front case 100B-1 and a second rear case 100B-2. A second user input module 130b is also disposed in the second body 100B, and particularly, at the front of the second front case 100B-1. Third and fourth user input modules 130c and 130d, the microphone 123 and the interface unit 170 are also provided in the second front case 100B-1 or the second rear case 100B-2. Further, the first through fourth user input modules 130a through 130d may be collectively referred to as the user input unit 130. The user input unit 130 may also adopt various manipulation methods including offering tactile feedback to the user.

In addition, the first user input module 130a allows the user to input various commands such as 'start', 'end', and 'scroll' to the mobile terminal 100, the second user input module 130b can be used to input various numerals, characters or symbols, and the third and fourth user input modules 130c and 130d can be used as hot keys for activating certain functions of the mobile terminal 100.

The microphone 123 is also configured to properly receive the user's voice or other sounds, and the interface unit 170 serves as a pathway for allowing the mobile terminal 100 to exchange data with an external device. For example, the interface unit 170 may include at least one of a connector for connecting earphones to the mobile terminal wiredly or wirelessly, a port for performing short-range communication, and a power supply port for supplying power to the mobile terminal 100. Alternatively, the interface unit 170 may include a card socket for receiving a SIM card, a UIM card or an exterior card such as a memory card.

Figure 3:
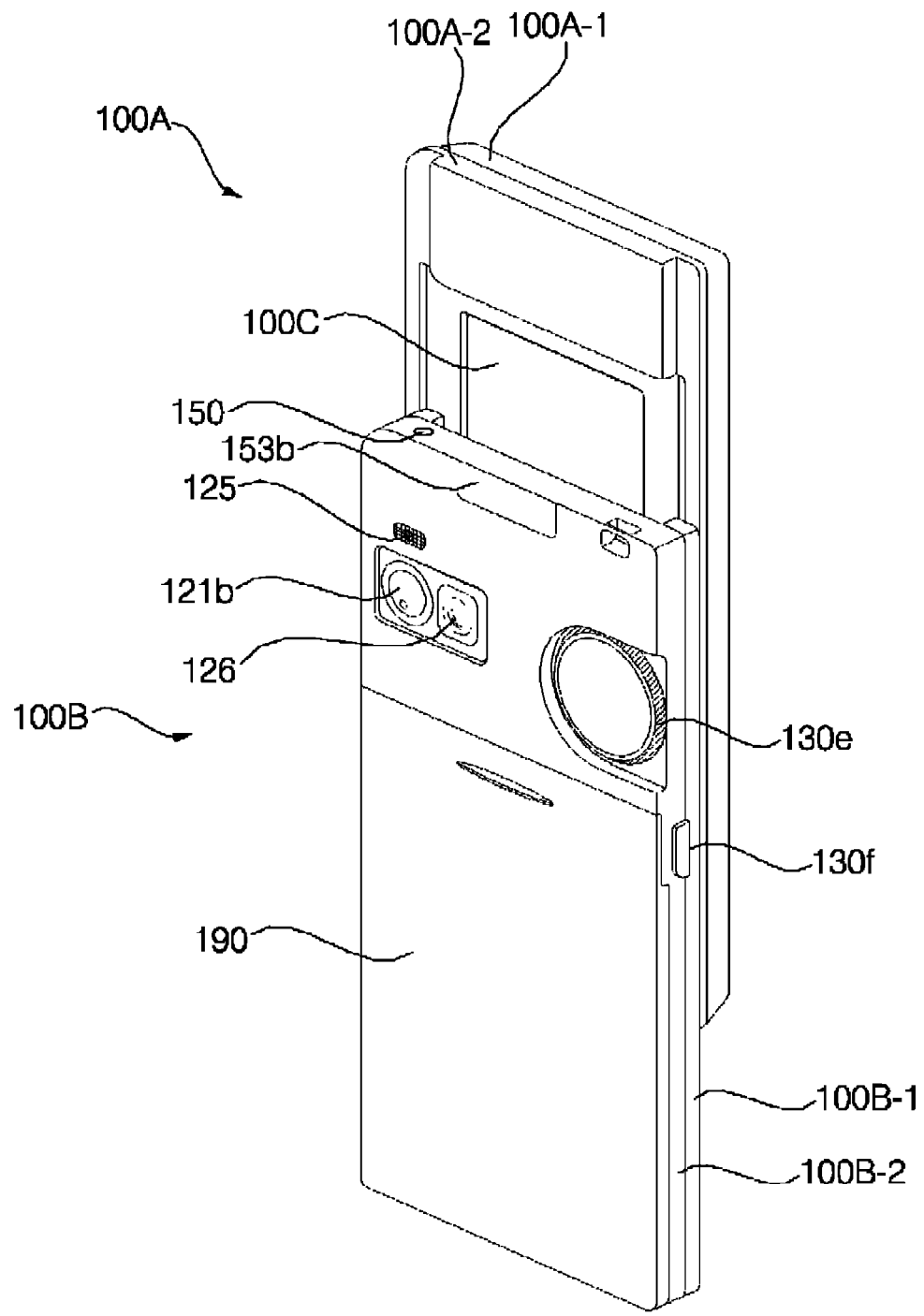
FIG. 3 is a rear perspective view illustrating the mobile terminal shown in FIG. 2.

Next, FIG. 3 is a rear perspective view illustrating the mobile terminal 100 shown in FIG. 2. Referring to FIG. 3, a fifth user input module 130e, which is of a wheel type, and a second camera 121b are disposed at the rear of the second rear case 100B-2 of the second body 100B, and a sixth user input module 130f is disposed on one side of the second body 100B. In addition, the second camera 121b may have a different photographing direction from that of the first camera 121a shown in FIG. 2. The first and second cameras 121a and 121b may also have different resolutions.

For example, the first camera 121a may be used to capture and then transmit an image of the face of the user during a video call. Thus, a low-resolution camera may be used as the first camera 121a. In addition, the second camera 121b may be used to capture an image of an ordinary subject. In this instance, the image captured by the second camera 121b may not need to be transmitted. Thus, a high-resolution camera may be used as the second camera 121b. A camera flash 125 and a mirror 126 are also disposed near the second camera 121b. In more detail, the cameral flash 125 may be used to illuminate a subject when the user attempts to capture an image of the subject with the second camera 121b, and the user can use the mirror 126 when taking a self portrait.

A second audio output module 153b may also be provided in the second rear case 100B-2. Thus, the second audio output module can realize a stereo function along with the first audio output module 153a. The second audio output module 153b may also be used in a speaker-phone mode. In addition, an antenna (not shown) for receiving a broadcast signal may be disposed on one side of the second rear case 100B-2, and be installed so as to be able to be pulled out of the second rear case 100B-2.

As shown in FIG. 3, the slide module 100C is partially exposed on the first rear case 100A-2 of the first body 100A. The slide module 100C also couples the first body 100A and the second body 100B such that the first body 100A and the second body 100B can slide up and down against each other. A portion of the slide module 100C is hidden from view by the second front case 100B-1 of the second body 100B, and thus may not be exposed.

In addition, the second camera 121b and the other elements that have been described as being provided on the rear case 100A-2 can also be provided on the front case 100A-1. In addition, the first camera 121a can be configured to be rotatable and thus to cover the photographing direction of the second camera 121b. In this instance, the second camera 121b may be optional. Further, the power supply unit 190 is disposed in the second rear case 100B-2, and may be a rechargeable battery and be coupled to the second rear case so as to be attachable to or detachable from the second rear case.

Figure 4:
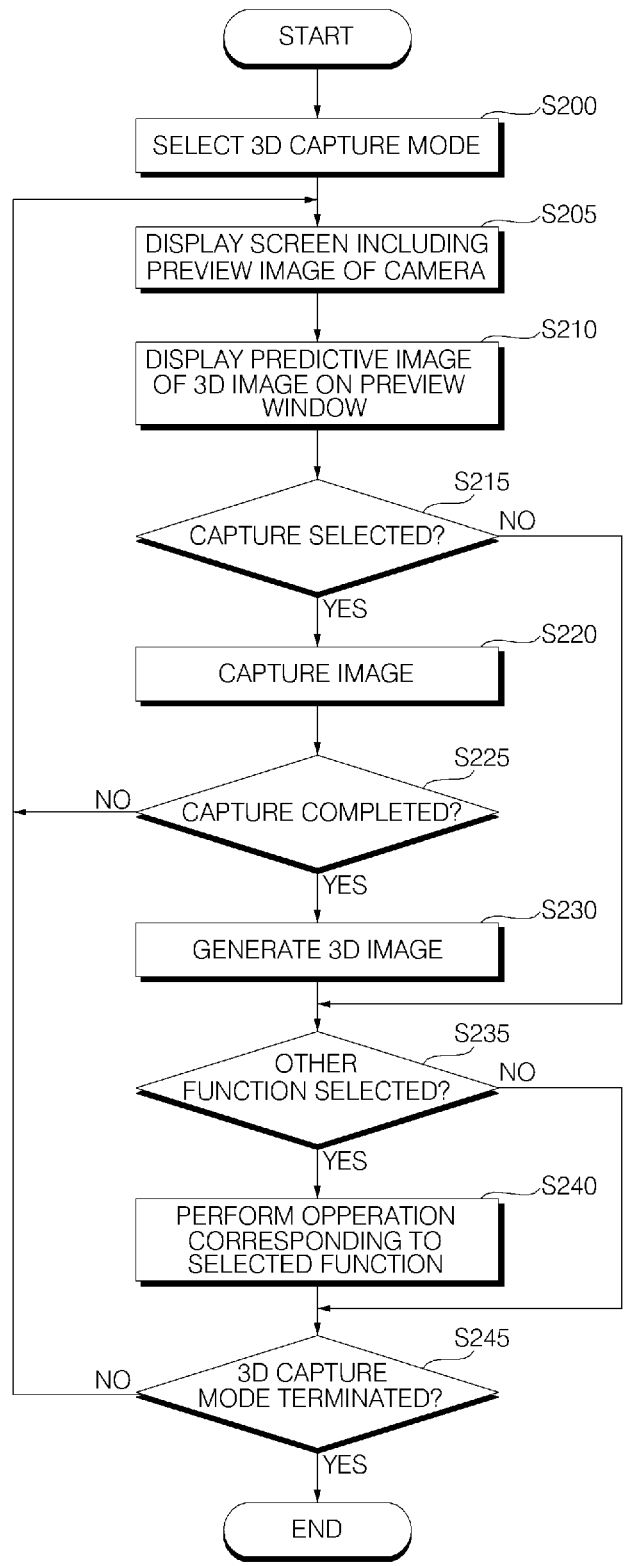
FIG. 4 is a flow chart illustrating a method for controlling the operation of a mobile terminal according to an embodiment of the present invention.

FIG. 4 is a flow chart illustrating a method for controlling the operation of a mobile terminal according to an embodiment of the present invention.

As shown in FIG. 4, when a 3D capture mode for generating a 3D stereoscopic image is selected from a camera menu according to a user command (S200), the controller 180 displays a screen including a preview image corresponding to an image received through the camera 121 on the display module 151 (S205). The controller 180 sets a preview window in a region on the screen and displays, on the preview window, a predictive image of a 3D stereoscopic image that can be generated using images of a subject corresponding to the preview image (S210).

Generally, a 3D stereoscopic image can be generated by combining 2, 3, 6, 9, and 12 captured images. Accordingly, the number of images used to generate a 3D stereoscopic image may be preset when the 3D capture mode is selected.

In addition, a predictive image of a 3D stereoscopic image that can be generated by combining a previously captured image and a currently captured image is displayed on the preview window. A portion corresponding to the currently displayed preview image may be displayed in the predictive image displayed on the preview window so that the portion is distinguishable from other portions. Accordingly, the user can intuitively determine a portion of the subject which is to be captured, the capture angle, and the like while viewing the predictive image displayed on the preview window.

When the user selects "capture", for example, by operating a capture button (S215), the controller 180 captures an image of the subject through the camera 121 (S220). The captured image may be stored in the memory 160. When image capture is completed according to a user command or as the number of the captured images reaches a preset capture count (S225), the controller 180 generates a 3D stereoscopic image using the captured images (S230).

If the user selects a function other than "capture" (S235), the controller 180 controls the mobile terminal to perform an operation corresponding to the selected function (S240).

The above procedure is repeatedly performed until the 3D capture mode is terminated (S245). In this manner, the mobile terminal may provide a 3D stereoscopic image preview function in the 3D capture mode.

Figure 5:
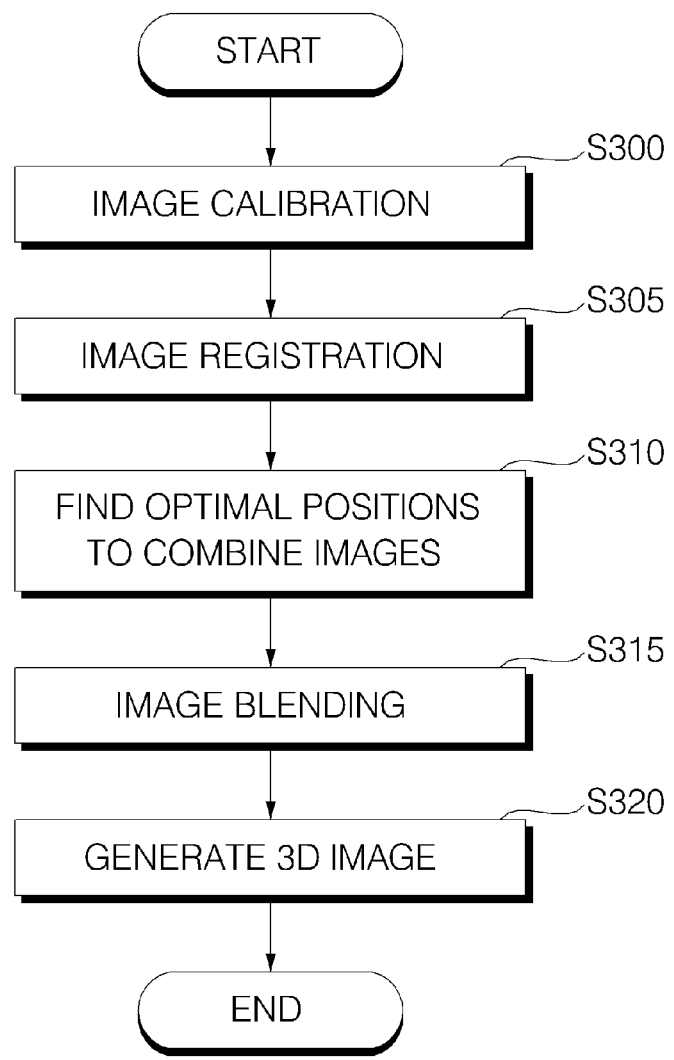
FIG. 5 is a flow chart illustrating a procedure for generating a 3D stereoscopic image.

FIG. 5 is a flow chart illustrating a procedure for generating a 3D stereoscopic image in a method for controlling the operation of a mobile terminal according to an embodiment of the present invention. Here, 3D stereoscopic image generation may be performed by the controller 180 and may also be performed by an image processor provided separately from the controller 180.

As shown in FIG. 5, the controller 180 performs image calibration on each image to be used to generate a 3D stereoscopic image among the images that have been captured through the camera 121 and stored in the memory 160 (S300). Image calibration is a preprocessing procedure that is performed, before images are combined to generate a 3D stereoscopic image, to correct the images such that there is no difference between connected portions of the images so that the images are naturally connected to generate the 3D stereoscopic image.

A correction method such as a perspective distortion correction, vignetting correction, or chromatic aberration correction is used to perform image calibration. When perspective distortion correction is used, there is a need to perform correction of, especially, barrel distortion and pincushion distortion. Vignetting correction corrects darkening of edges of the images. Chromatic aberration correction corrects a phenomenon in which different colors are focused on different positions since refractive index varies depending on the wavelength of light.

The controller 180 then performs image registration (S305). Image registration is an image adjustment procedure in which one of two images to be combined is set as a reference image and the other is set as a target image and similarity between the reference and target images is obtained. A method such as an intensity-based method which obtains similarity of brightness or a feature-based method which obtains similarity of points, lines, contours, or the like may be used to obtain similarity between the reference and target images.

The controller 180 determines optimal positions of the images to be combined using motion vectors of the images or the like and then combines the images at the optimal positions (S310).

When the images are combined, the controller 180 performs image blending (S315). Image blending is a post-processing procedure that is performed to achieve smooth connection of the combined images.

The image blending procedure includes processes such as color correction, dynamic range extension, motion compensation, de-ghosting, and de-blurring for moving objects. Here, color correction is a process for minimizing color difference between the combined images. Dynamic range extension is a process for matching dynamic ranges of images as closely as possible to achieve smooth expression of the images since the images may have different dynamic ranges. The processes such as motion compensation, de-ghosting, and de-blurring for moving objects are performed to combine two captured images by blending the images at an appropriately selected ratio when a moving object is present since the two captured images may have no connected portions.

When the blending process is completed, a 3D stereoscopic image is finally generated (S320). The generated 3D stereoscopic image may be stored in the memory 160 to be used for various purposes.

Figure 6:
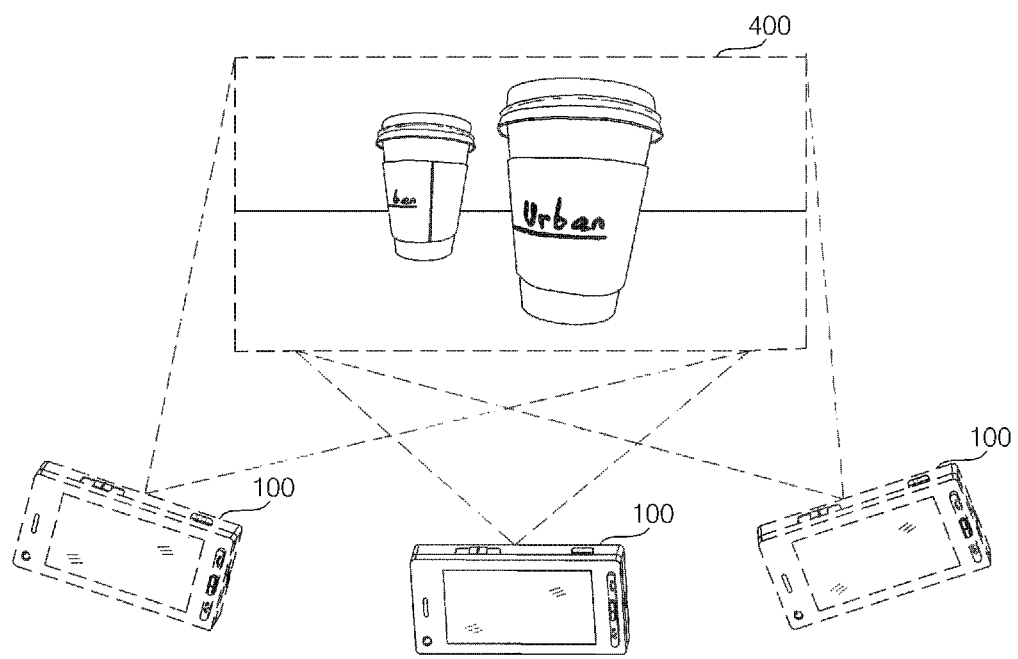
FIGS. 6 and 7 illustrate a procedure for generating a 3D stereoscopic image using a single camera.
Figure 7:
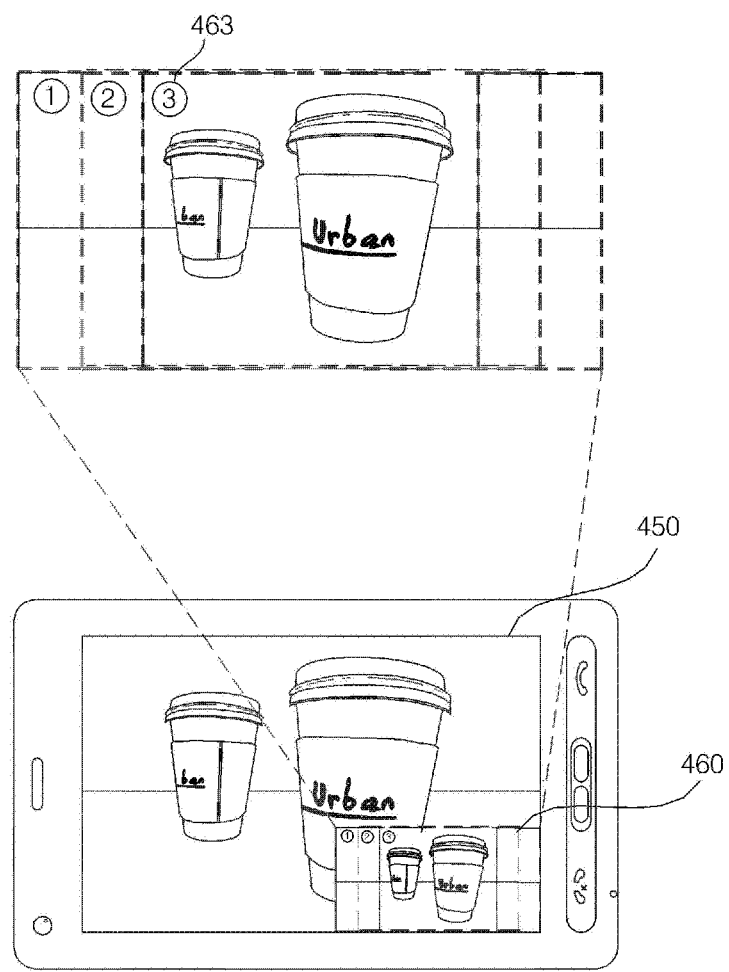

The following FIGS. 6 to 15 illustrate a method for controlling the operation of a mobile terminal according to an embodiment of the present invention. First, FIGS. 6 and 7 illustrate a procedure for generating a 3D stereoscopic image using a single camera.

As shown in FIG. 6, an original image 400 may be captured from a number of directions using a single camera in a 3D capture mode and a 3D stereoscopic image may then be generated by combining the captured images. Here, as shown in FIG. 7, a 3D stereoscopic image preview window 460 may be displayed on a portion of a screen 450 on which a preview image of the camera is displayed. A predictive image of a 3D stereoscopic image that may be generated using the captured images is displayed on the preview window 460. A portion corresponding to the current preview image may be displayed on the predictive image. A number 463 indicating the ordinal number of each of the captured images may be displayed on the predictive image.

As described above, the 3D stereoscopic image preview window 460 may be displayed on the screen 450 on which the preview image is displayed and thus the user can easily operate the camera while viewing the predictive image displayed on the preview window 460.

Figure 8:
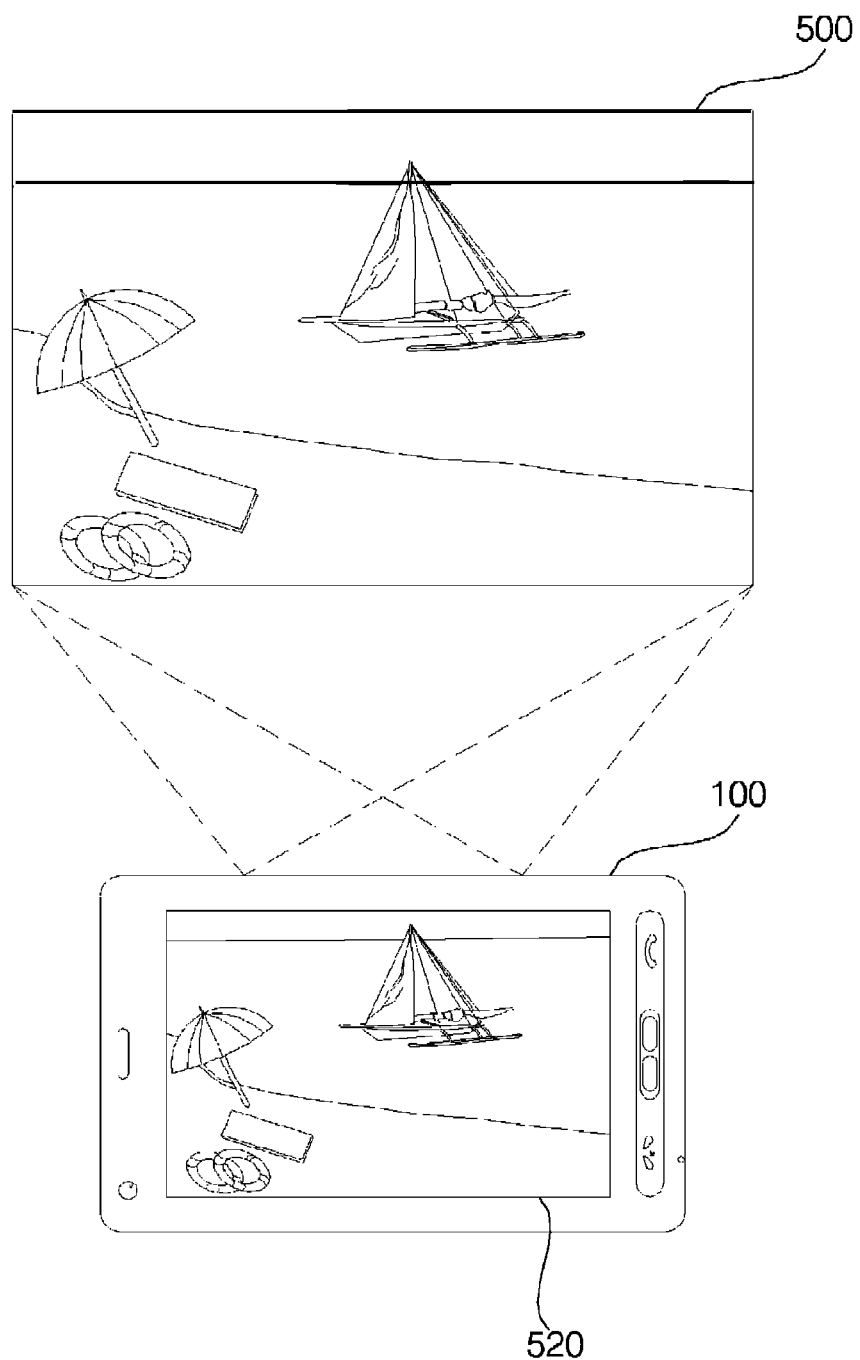
FIGS. 8 and 9 illustrate a procedure for generating a 3D stereoscopic image using dual cameras.
Figure 9:
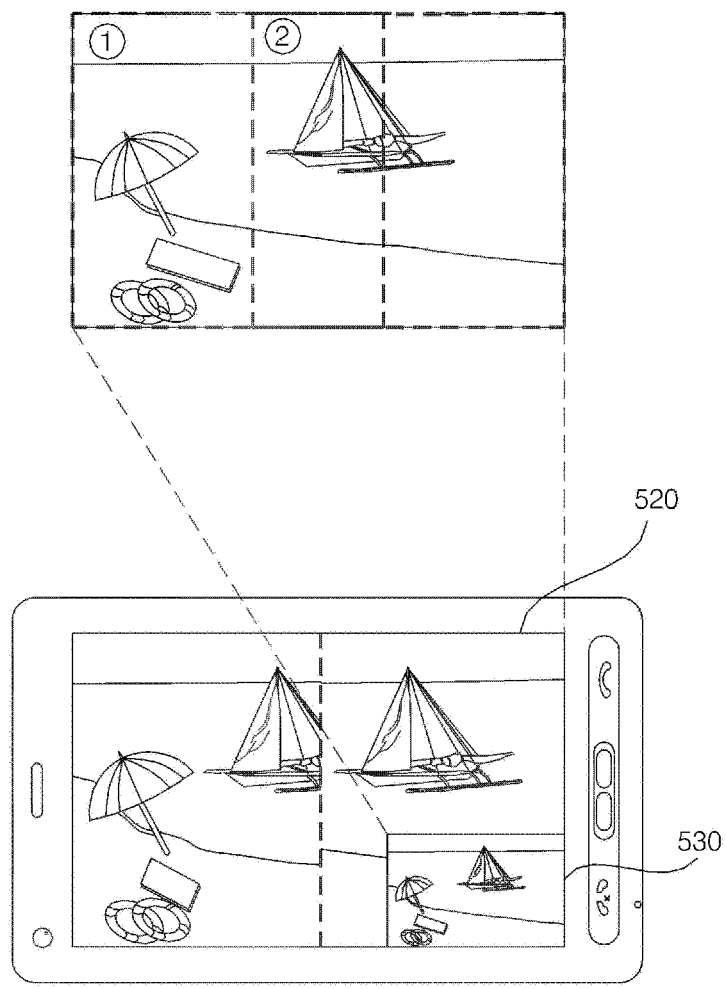
Figure 11:
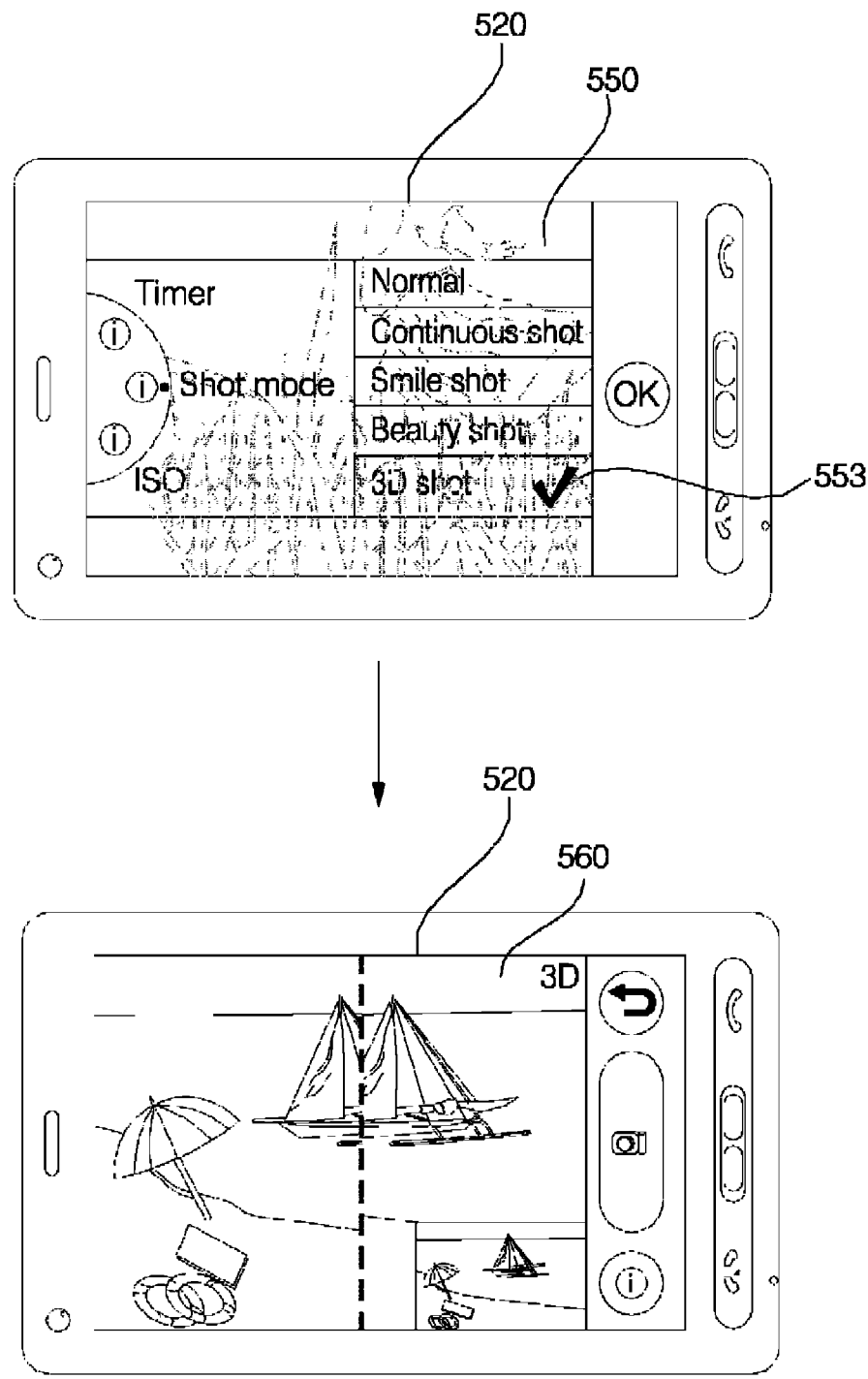

FIGS. 8 and 9 illustrate a procedure for generating a 3D stereoscopic image using dual cameras. As shown in FIG. 8, when dual cameras are provided on the second rear case 100B-2 of the second body 100B, a 3D stereoscopic image may be generated by capturing an original image 500 only once.

In this case, as shown in FIG. 9, a 3D stereoscopic image preview window 530 is displayed on a screen 520 on which a preview image is displayed. The screen 520 may be divided into two sections corresponding respectively to the dual cameras and the respective preview images may be displayed on the two sections of the screen 520.

FIG. 10 illustrates an exemplary camera menu screen. As shown in FIG. 10(a), the user may select a "3D shot" item 543 on a camera menu screen 540 to enter the 3D capture mode.

When the user has selected the "3D shot" mode 543 on the camera menu screen 540, a menu 545 allowing the user to select the number of images used to generate a 3D stereoscopic image may be displayed on the camera menu screen 540 as shown in FIG. 10(b). When the number of images has been selected on the menu 545, an ID number indicating the ordinal number of a currently captured image may be displayed on a specific region of the screen. A guideline, which facilitates combination with already captured images, may also be displayed on a screen on which a preview image is displayed.

FIG. 11(a) illustrates a camera screen when dual cameras are provided. In this case, when the user has selected a "3D shot" item 553 on a camera menu screen 550, a screen 560 on which a preview image is displayed may be displayed, as illustrated in FIG. 11(b).

Figure 12:
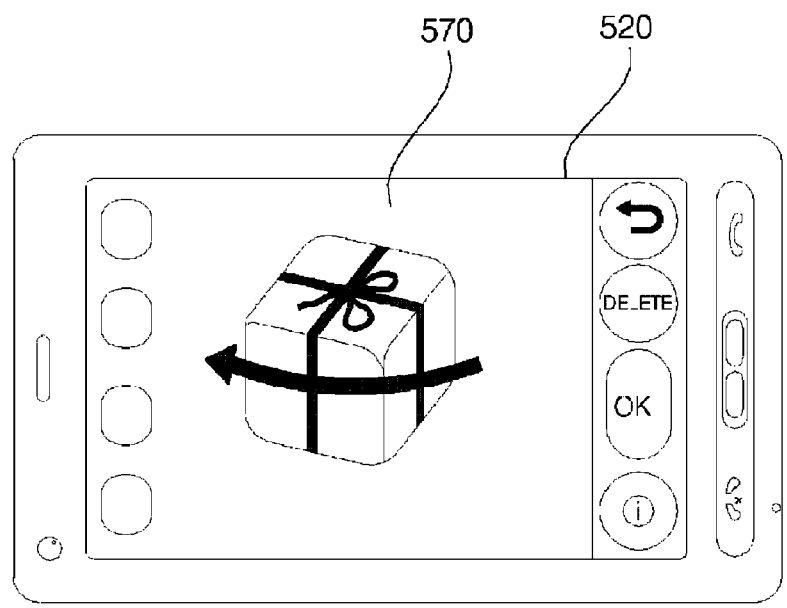
FIG. 12 illustrates an example of a screen on which a 3D stereoscopic image is displayed.

FIG. 12 illustrates an example of a screen on which a 3D stereoscopic image is displayed. A 3D stereoscopic image may be displayed according to a user command or the like. The 3D stereoscopic image displayed on the screen 570 may be enlarged, reduced, or rotated and displayed according to a user command.

Figure 13:
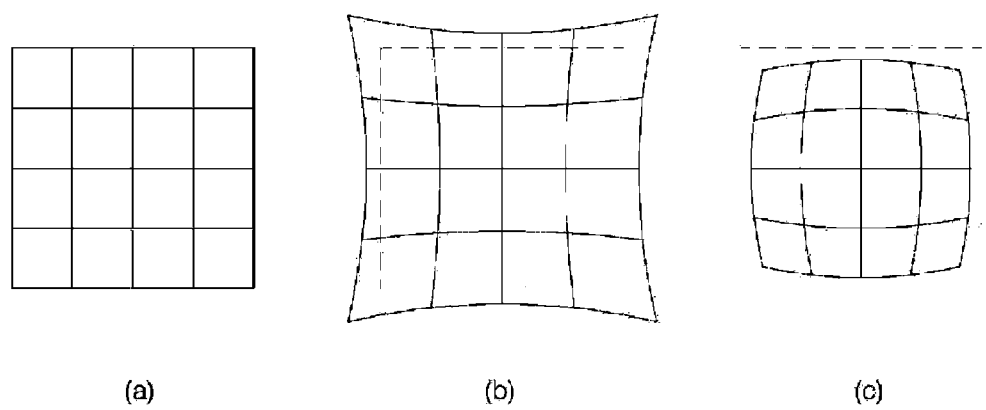
FIGS. 13 to 15 illustrate a procedure for combining images to generate a 3D stereoscopic image.
Figure 14:
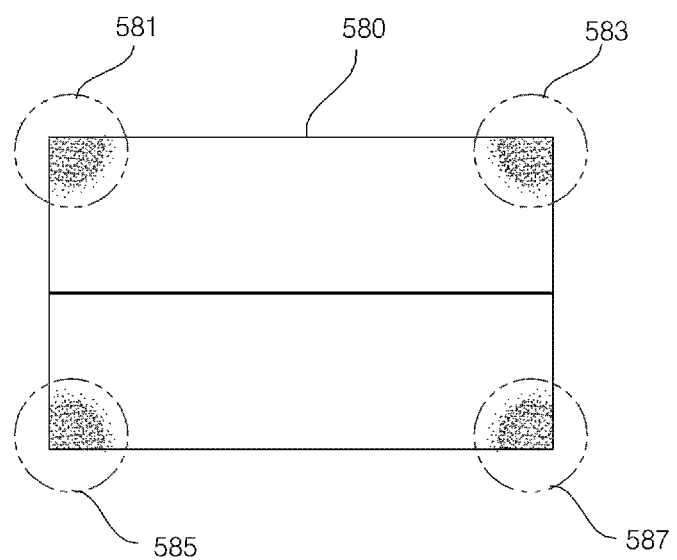
Figure 15:
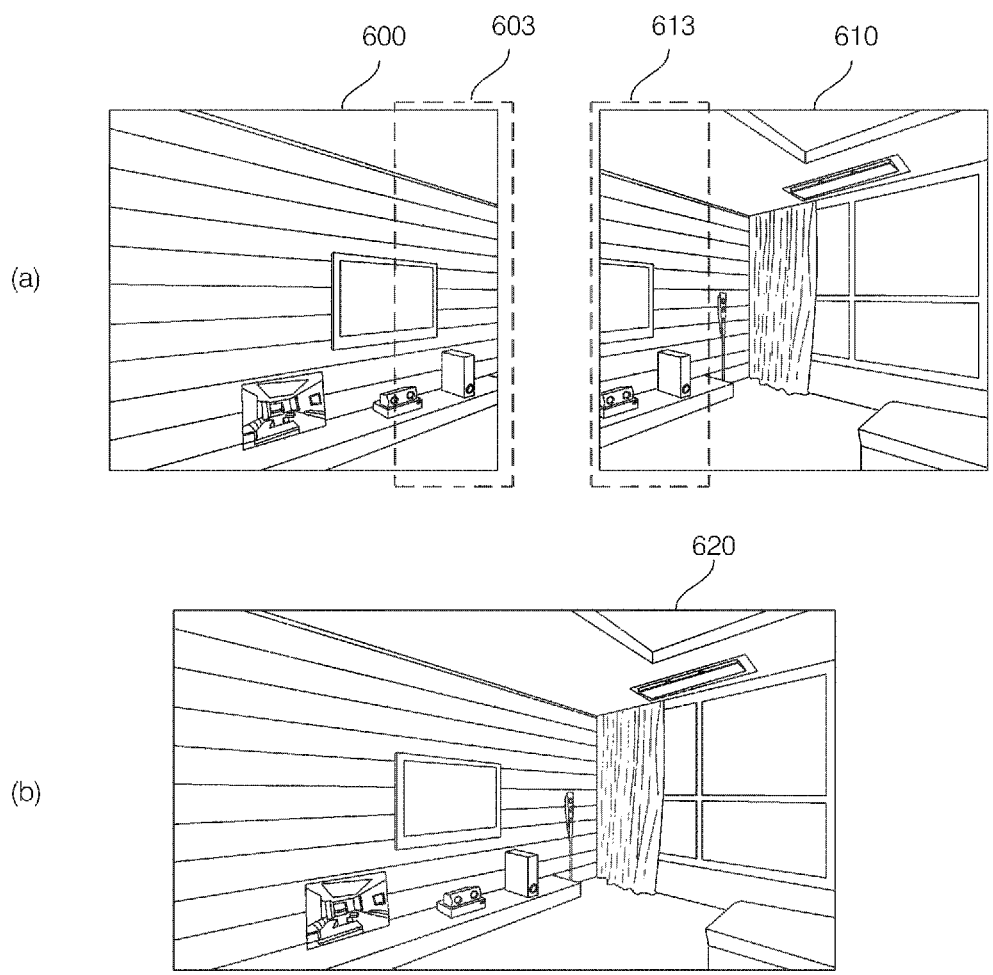

The following FIGS. 13 to 15 illustrate a procedure for combining images to generate a 3D stereoscopic image. FIGS. 13(a) to 13(c) illustrate an example in which perspective distortion correction is needed. Specifically, FIG. 13(a) illustrates a normal image, FIG. 13(b) illustrates that pincushion distortion has occurred, and FIG. 13(c) illustrates that barrel distortion has occurred.

FIG. 14 illustrates an example in which vignetting correction is needed. When corners 581, 583, 585, and 587 of a captured image 580 are dark, vignetting correction is performed as described above.

In the image calibration procedure, perspective distortion correction, vignetting correction, and the like are performed so as to naturally connect the images.

FIGS. 15(a) to 15(c) illustrate a procedure for combining images. As shown in FIG. 15(a), two images 600 and 610 that have been subjected to a preprocessing procedure are compared to determine similar portions of the two images and the images are then combined based on the similar portions. Here, only portions 603 and 613 of the two images 600 and 610 rather than the entire regions thereof may be compared for similarity to increase processing speed. FIG. 15(b) illustrates an image 620 generated by combining the images 600 and 610. The size of the image 620 generated by combining the images 600 and 610 may be smaller than the sum of the sizes of the images 600 and 610.

A 360-degree panorama 3D stereoscopic image may be generated by combining images while performing image processing in both horizontal directions throughout 360 degrees and the generated 3D stereoscopic image may then be displayed in a horizontal or cylindrical form.

By providing a function to preview a 3D stereoscopic image in the above manner, it is possible to allow the user to easily operate the camera when they capture images to obtain a 3D stereoscopic image. The mobile terminal and the method for controlling the operation of the same according to the present invention are not limited in their applications to the configurations and methods of the embodiments described above and all or some of the embodiments may be selectively combined to implement various modifications.

The method for controlling a mobile terminal according to the present invention can be embodied as processor readable code on a processor readable medium provided in the mobile terminal such as a Mobile Station Modem (MSM). The processor readable medium includes any type of storage device that stores data which can be read by a processor. Examples of the processor readable medium include Read-Only Memory (ROM), Random-Access Memory (RAM), CD-ROMs, magnetic tape, floppy disks, optical data storage devices, and so on. The processor readable medium can also be embodied in the form of carrier waves as signals transmitted over the Internet. The processor readable medium can also be distributed over a network of coupled processor systems so that the processor readable code is stored and executed in a distributed fashion.

As is apparent from the above description, a mobile terminal and a method for controlling the operation of the same according to the present invention provide a function to preview a 3D stereoscopic image that can be generated using a currently captured image in a 3D capture mode for generating a 3D stereoscopic image. Thus, the user can easily operate the camera using the 3D stereoscopic image preview function.

Although the present invention has been illustrated and described above with reference to the specific embodiments, the present invention is not limited to the specific embodiments and it will be apparent to those skilled in the art that various modifications can be made to the embodiments without departing from the scope of the present invention as disclosed in the accompanying claims and such modifications should not be construed as departing from the spirit or scope of the present invention.

What is claimed is:

1. A method for controlling an operation of a mobile terminal, the method comprising:
    displaying a two-dimensional (2D) preview image of an object being captured by a camera on a screen of a display module in response to selection of a three-dimensional (3D) capture mode;
    establishing a predictive image window in a region of the screen;
    concurrently displaying a predictive image on the predictive image window while the preview image is displayed on the remaining portion of the screen to allow the predictive image to be viewed separately from the preview image, the predictive image comprising a predicted result of a three-dimensional (3D) stereoscopic image that can be generated using a plurality of combined images comprising the preview image and at least one previously captured 2D image of the object; and
    displaying a plurality of identification (ID) numbers on the predictive image window, each of the plurality of ID numbers indicating an ordinal number of each of the plurality of combined images.

2. The method of claim 1, further comprising capturing a current image of the preview image and generating the 3D stereoscopic image using the captured current image and the at least one previously captured 2D image captured by the camera.

3. The method of claim 2, further comprising displaying the generated 3D stereoscopic image on the screen of the display module.

4. The method of claim 3, further comprising rotating and displaying the 3D stereoscopic image on the screen of the display module according to a user command.

5. The method of claim 2, further comprising setting a total number of 2D images used to generate the 3D stereoscopic image.

6. The method of claim 2, wherein generating the 3D stereoscopic image comprises performing preprocessing correction on the 2D images used to generate the 3D stereoscopic image.

7. The method of claim 6, wherein generating the 3D stereoscopic image further comprises performing post-processing correction on the generated 3D stereoscopic image.

8. The method of claim 1, wherein displaying the predictive image further comprises distinguishably displaying the preview image from the at least one previously captured 2D image.

9. The method of claim 1, further comprising displaying a guideline on the screen for facilitating alignment of the plurality of combined images.

10. A mobile terminal comprising:
    a camera configured to capture images;
    a display module configured to display a screen including an image captured by the camera; and
    a controller configured to:
        cause the display module to display a two-dimensional (2D) preview image of an object being captured by the camera on the screen in response to selection of a three-dimensional (3D) capture mode;
        cause the display module to establish a predictive window in a region of the screen;
        cause the display module to concurrently display a predictive image on the predictive window while the preview image is displayed on the rest of the screen to allow the predictive image to be viewed separately from the preview image, the predictive image comprising a predicted result of a three-dimensional (3D) stereoscopic image that can be generated using a plurality of combined images comprising the preview image and at least one previously captured 2D image of the object; and
        cause the display module to display a plurality of identification (ID) numbers on the predictive image window, each of the plurality of ID numbers indicating an ordinal number of each of the plurality of combined images.

11. The mobile terminal of claim 10, wherein the controller is further configured to cause the camera to capture a current image of the preview image and generate the 3D stereoscopic image using the captured current image and the at least one previously captured 2D image captured by the camera.

12. The mobile terminal of claim 11, wherein the controller is further configured to cause the display module to display the 3D stereoscopic image on the screen.

13. The mobile terminal of claim 12, wherein the controller is further configured to cause the display module to display the 3D stereoscopic image rotated according to a user command.

14. The mobile terminal of claim 11, wherein the controller is further configured to set a total number of 2D images used to generate the 3D stereoscopic image.

15. The mobile terminal of claim 11, wherein the controller is further configured to generate the 3D stereoscopic image by performing preprocessing correction on the 2D images used to generate the 3D stereoscopic image.

16. The mobile terminal of claim 15, wherein the controller is further configured to generate the 3D stereoscopic image by performing post-processing correction on the generated 3D stereoscopic image.

17. The mobile terminal of claim 10, wherein the controller is further configured to cause the display module to distinguishably display the preview image from the at least one previously captured 2D image.

18. The mobile terminal of claim 10, wherein the controller is further configured to cause the display module to display a guideline on the screen for facilitating alignment of the plurality of combined images.

19. A mobile terminal comprising:
    a first camera and a second camera each configured to capture images from different vantage points of the mobile terminal;
    a display module configured to display a screen including captured images; and
    a controller configured to:
        cause the display module to display a first two-dimensional (2D) preview image of an object being captured by the first camera on a first preview portion of the screen;
        cause the display module to display a second 2D preview image of the object being captured by the second camera on a second preview portion of the screen while the first preview portion is still being displayed;
        cause the display module to establish a predictive window portion on the screen;
        concurrently display a predictive image on the predictive window portion while the first preview image and the second preview image are displayed on a remaining portion of the screen to allow the predictive image to be viewed separately from the first and second preview images, wherein the predictive image comprises a predicted result of a three-dimensional (3D)

stereoscopic image that can be generated using a plurality of combined images comprising at least the first and second preview images; and cause the display module to display a plurality of identification (ID) numbers on the predictive image window, each of the plurality of ID numbers indicating an ordinal number of each of the plurality of combined images.

* * * * *